US009875206B2

(12) United States Patent
Hall

(10) Patent No.: US 9,875,206 B2
(45) Date of Patent: *Jan. 23, 2018

(54) METHODS AND DEVICES FOR EXTENDING USB 3.0-COMPLIANT COMMUNICATION

(71) Applicant: Icron Technologies Corporation, Burnaby (CA)

(72) Inventor: Aaron T.J. Hall, North Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 319 days.

This patent is subject to a terminal disclaimer.

(21) Appl. No.: 14/727,761

(22) Filed: Jun. 1, 2015

(65) Prior Publication Data
US 2015/0309958 A1 Oct. 29, 2015

Related U.S. Application Data

(63) Continuation of application No. 13/683,993, filed on Nov. 21, 2012, now Pat. No. 9,047,418.

(60) Provisional application No. 61/562,716, filed on Nov. 22, 2011.

(51) Int. Cl.
G06F 13/40 (2006.01)
G06F 13/42 (2006.01)

(52) U.S. Cl.
CPC ........ *G06F 13/4045* (2013.01); *G06F 13/405* (2013.01); *G06F 13/4286* (2013.01); *G06F 13/4295* (2013.01)

(58) Field of Classification Search
CPC ............. G06F 13/4045; G06F 13/4295; G06F 13/4286; G06F 13/405
See application file for complete search history.

(56) References Cited

U.S. PATENT DOCUMENTS

| 6,603,744 | B2 | 8/2003 | Mizutani |
| 7,149,833 | B2 | 12/2006 | McLeod |
| 7,587,536 | B2 | 9/2009 | McLeod |
| 2002/0010821 | A1 | 1/2002 | Yu |
| 2002/0144042 | A1 | 10/2002 | Garney |
| 2004/0177197 | A1 | 9/2004 | McLeod |
| 2004/0205276 | A1 | 10/2004 | Ferguson |

(Continued)

FOREIGN PATENT DOCUMENTS

JP 2000-0332791 A 11/2000

OTHER PUBLICATIONS

Anderson, D., "Introduction to USB 3.0," MindShare, Inc., n.d., <http://www.mindshare.com>, [retrieved Sep. 30, 2010], 20 pages.

(Continued)

*Primary Examiner* — Thomas J Cleary
(74) *Attorney, Agent, or Firm* — Christensen O'Connor Johnson Kindness PLLC

(57) ABSTRACT

Devices and methods for extending USB-compliant communication distances, including USB 3.0 SuperSpeed communication, are provided. In some embodiments, a host is communicatively coupled to a device that provides an upstream facing port, and a USB device is communicatively coupled to a device that provides a downstream facing port. The upstream facing port and downstream facing port are coupled via a communication channel. In some embodiments, the upstream facing port and downstream facing port generate packets to ensure that timing requirements of the USB specification are met regardless of the latency of the communication channel.

26 Claims, 8 Drawing Sheets

(56) References Cited

U.S. PATENT DOCUMENTS

2005/0027889 A1  2/2005  Sandulescu
2005/0033877 A1  2/2005  McLeod
2005/0071733 A1  3/2005  Fukae
2005/0278472 A1  12/2005 Gierke
2006/0123166 A1  6/2006  Toebes
2006/0149863 A1  7/2006  Engler
2007/0239900 A1  10/2007 Beasley
2008/0162741 A1  7/2008  Christison
2010/0042767 A1  2/2010  McLeod
2011/0064023 A1  3/2011  Yamamoto
2011/0243035 A1  10/2011 Hall
2013/0067128 A1  3/2013  Sosniak
2013/0275629 A1  10/2013 Hall
2014/0122752 A1  5/2014  Toivanen

OTHER PUBLICATIONS

Chuah, A. (publisher), "MindShare Into to USB 3.0[1]," MindShare, Inc., Sep. 30, 2010, <http://www.scribd.com/doc/38442817/MindShare-Intro-to-USB-3-0-1#scribd>, 1 page.
"Universal Serial Bus 3.0 Specification (Including Errata and ECNs Through May 1, 2011)," Revision 1.0, Hewlett Packard et al., Jun. 6, 2011, 531 pages.

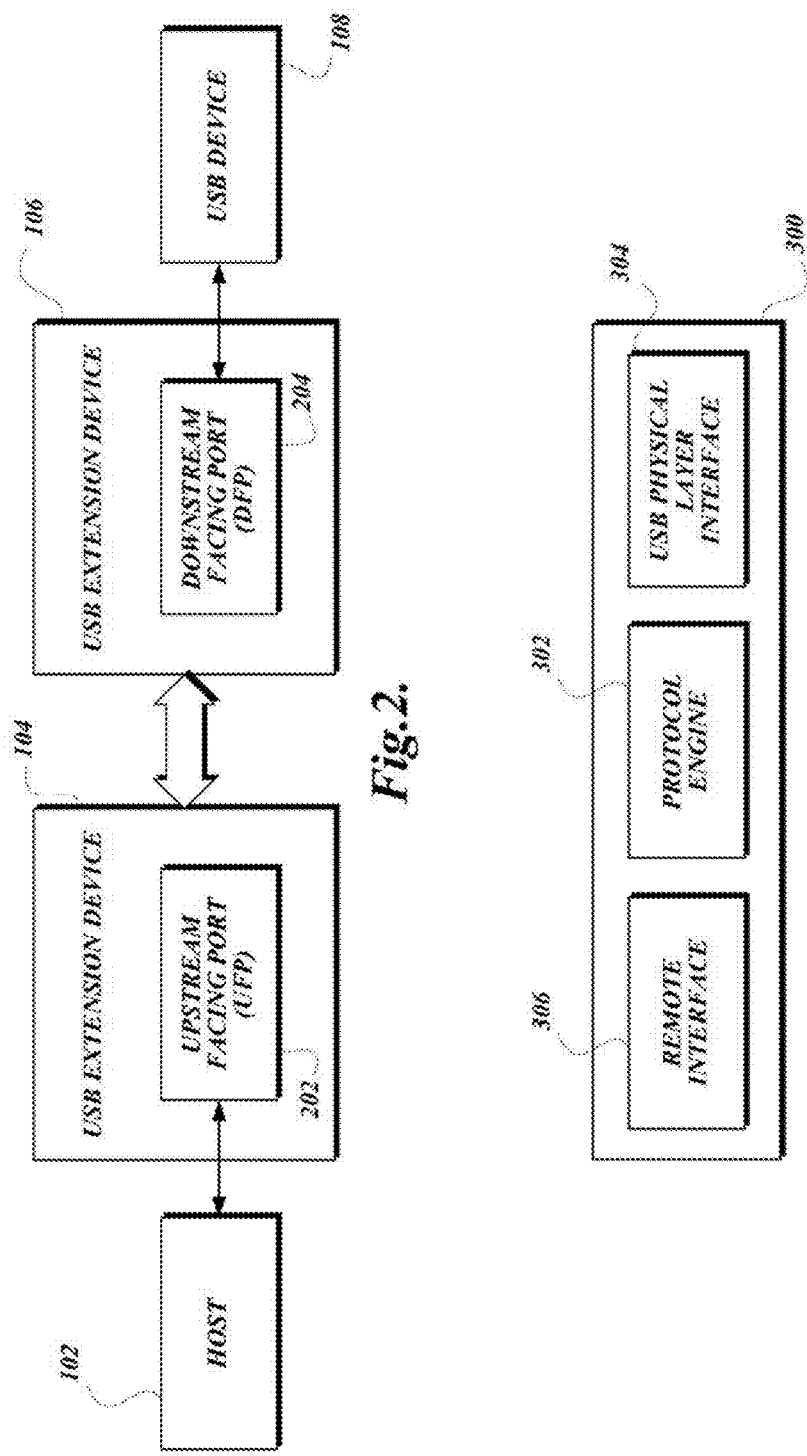

METHODS AND DEVICES FOR EXTENDING USB 3.0-COMPLIANT COMMUNICATION

CROSS-REFERENCES TO RELATED APPLICATIONS

This application is a continuation of application Ser. No. 13/683,993, filed Nov. 21, 2012, which claims the benefit of Provisional Application No. 61/562,716, filed Nov. 22, 2011, the entire disclosures of which are hereby incorporated by reference herein for all purposes.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008, and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under Revision 3.0 of the USB Specifications, SuperSpeed connections are provided that use a 5 Gbps signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, a new method and apparatus are needed to optionally allow for extension of a SuperSpeed USB device to a greater distance from the host to which it is coupled, such that SuperSpeed USB packets may be propagated between the host and the USB device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computing device configurable to provide a downstream facing port (DFP) for allowing a USB device to communicate with a host via an upstream facing port (UFP) is provided. The DFP is configured to receive a request packet via a non-USB communication channel; transmit the request packet via a USB-compliant communication channel to the USB device; receive a data packet from the USB device; transmit the data packet via the non-USB communication channel; generate an acknowledgement packet and transmit the generated acknowledgement packet to the USB device that implicitly indicates that the data packet was received by the host when the DFP is configured in a high latency mode; and receive an acknowledgement packet from the UFP and transmit the received acknowledgement packet to the USB device that implicitly indicates that the data packet was received by the host when the DFP is not configured in the high latency mode.

In some embodiments, a computing device configurable to provide an upstream facing port (UFP) for allowing a host to communicate with a USB device via a downstream facing port (DFP) is provided. The UFP is configured to receive a request packet via a USB-compliant communication channel from the host; transmit the request packet via a non-USB communication channel to the DFP; generate and transmit a packet to the host for placing the host in a waiting state or an asynchronous state; and transmit a packet to the host for removing the host from the waiting state or the asynchronous state in response to receiving at least a portion of a requested data packet from the DFP.

In some embodiments, a method for transmitting and receiving USB 3.0 packets across a communication channel that is not USB 3.0 compliant is provided. A first data packet is received from a host over a USB 3.0-compliant communication channel by an upstream facing port. The upstream facing port transmits the first data packet to a downstream facing port over the noncompliant communication channel. The upstream facing port generates an acknowledgement packet that indicates an available buffer count capable of storing a single packet before receiving an acknowledgement packet from the downstream facing port. The upstream facing port transmits the generated acknowledgement packet to the host.

In some embodiments, a method for transmitting and receiving USB 3.0 packets across a communication channel that is not USB 3.0 compliant is provided. A downstream facing port receives a first data packet from an upstream facing port via the noncompliant communication channel. The downstream facing port transmits the first data packet to a USB device via a USB 3.0-compliant communication channel. The downstream facing port receives, from the USB device, a response packet transmitted in response to the first data packet.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a block diagram that illustrates further details of the upstream USB extension device and downstream USB extension device illustrated in FIG. 1;

FIG. 3 is a block diagram that illustrates an exemplary embodiment of a port device 300 according to various aspects of the present disclosure;

DETAILED DESCRIPTION

Figure 1:
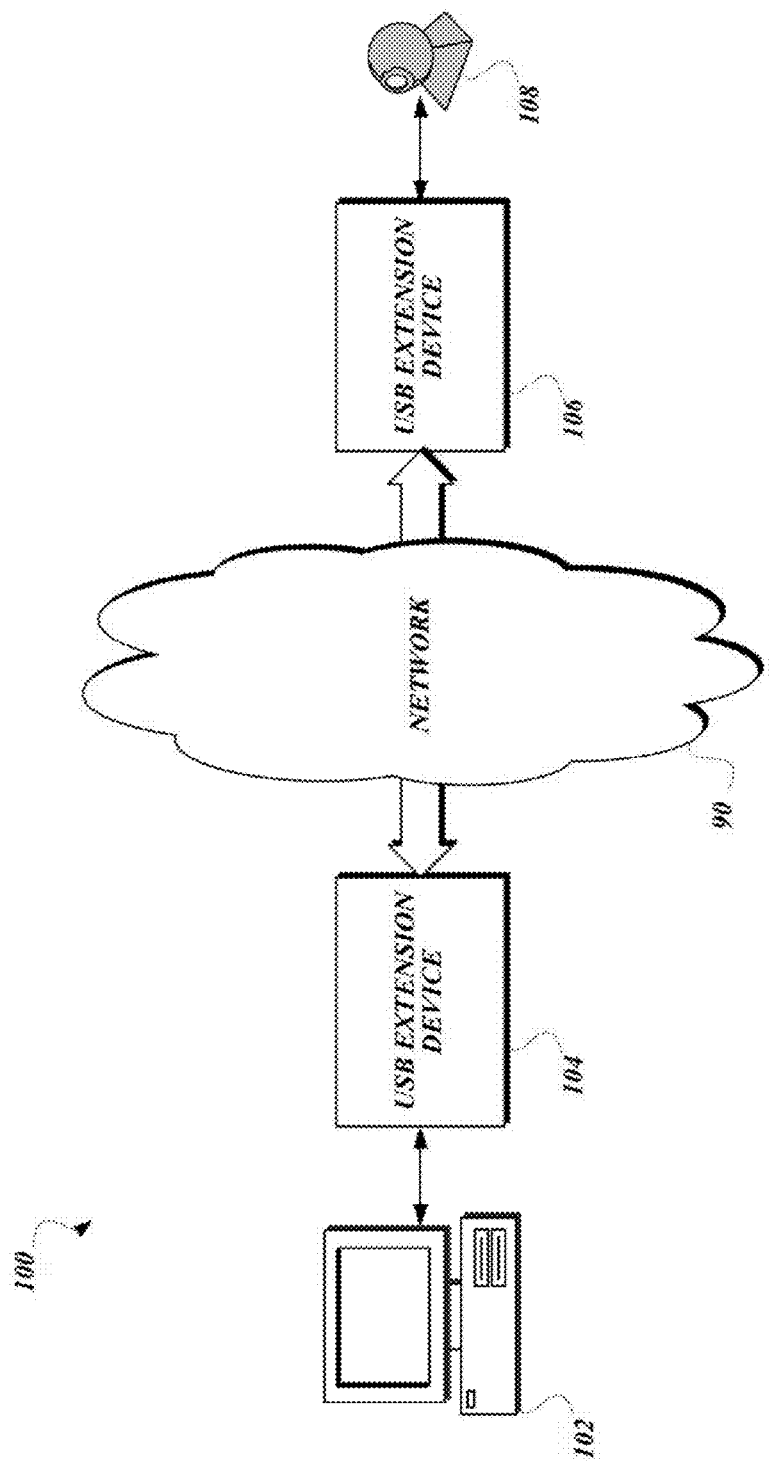
FIG. 1 is a block diagram that illustrates one embodiment of a system 100 for extending USB communication according to various embodiments of the present disclosure.

FIG. 1 is a block diagram that illustrates one embodiment of a system 100 for extending USB communication according to various embodiments of the present disclosure. The system 100 includes a host 102 and a USB device 108. Traditionally, the host 102 and the USB device 108 would be directly connected via a USB cable, and would communicate directly with one another via a protocol that conforms to a USB specification, such as USB 1.0, USB 1.1, USB 2.0, or USB 3.0. As discussed above, such a connection would be limited to a short distance between the host 102 and the USB device 108 due to the timing requirements of the USB specification.

The host 102 may be any type of computing device containing a USB host controller. Some examples of suitable hosts 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller. The example illustrated in FIG. 1 is a webcam, but some other examples of suitable USB devices 108 may include, but are not limited to, a human interface device such as a keyboard or mouse, a mass storage device such as a flash drive or external hard drive, a USB-capable medical device, a printer, a USB hub, a wireless controller, and/or the like.

In the present system 100, the host 102 is connected via a USB protocol to an upstream USB extension device 104, and the USB device 108 is connected via a USB protocol to a downstream USB extension device 106. The upstream USB extension device 104 and the downstream USB extension device 106 are communicatively coupled via a network 90 that may increase the distance between the host 102 and the USB device 108 beyond that supported by the USB specification. The network 90 and communication thereon may include any suitable networking technology, such as Ethernet, Bluetooth, WiFi, WiMax, the Internet, and/or the like, and any suitable communication medium, such as via physical cables, via wireless spectrum, and/or the like.

In some embodiments, the upstream USB extension device 104 and the downstream USB extension device 106 may happen to be closer to each other than the short USB requirement distance, and/or may be directly connected by a cable instead of via a network 90, but retain the capability of overcoming increased latency between the host 102 and the USB device 108 as described further below.

FIG. 2 is a block diagram that illustrates further details of the upstream USB extension device 104 and downstream USB extension device 106 illustrated in FIG. 1. The upstream USB extension device 104 includes an upstream facing port 202, and the downstream USB extension device 106 includes a downstream facing port 204. As used herein, the terms "upstream facing port" and the corresponding acronym "UFP" may be used interchangeably, as may the terms "downstream facing port" and the corresponding acronym "DFP." The UFP 202 is configured at least to communicate with the host 102 via a USB-standard-compliant protocol, and to exchange messages and USB bus traffic with the DFP 204. The DFP 204 is configured at least to communicate with the device 108 via a USB-standard-compliant protocol, and to exchange messages and USB bus traffic with the UFP 202. The upstream USB extension device 104 and the downstream USB extension device 106 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 2, the upstream facing port 202 of the upstream USB extension device 104 is connected to a downstream facing port of a host, and the downstream facing port 204 of the downstream USB extension device 106 is connected to an upstream facing port of a USB device 108. In other embodiments, the upstream facing port 202 of the upstream USB extension device 104 may be connected to a downstream facing port other than one provided by a host, such as a downstream facing port of a hub and/or the like. Likewise, in other embodiments, the downstream facing port 204 of the downstream USB extension device 106 may be connected to an upstream facing port other than one provided by a USB device 108, such as an upstream facing port of a hub and/or the like. The discussion below is primarily in terms of the simple topology illustrated in FIG. 2, but one of ordinary skill in the art will recognize that in some embodiments similar techniques may be used in other topologies without departing from the scope of the present disclosure.

FIG. 3 is a block diagram that illustrates an exemplary embodiment of a port device 300 according to various aspects of the present disclosure. In some embodiments, the port device 300 may be constructed to provide services of an upstream facing port 202, and in some embodiments the port device 300 may be constructed to provide services of a downstream facing port 204. In some embodiments, the port device 300 may include instructions to provide services of both an upstream facing port 202 and a downstream facing port 204, wherein the particular port services that are provided are determined by a user configuration such as a jumper switch, a firmware setting, and/or the like.

As illustrated, the port device 300 includes a protocol engine 302, a USB physical layer interface 304, and a remote interface 306. In some embodiments, the protocol engine 302 may be configured to provide and/or execute the logic discussed below with regard to the UFP 202 and/or the DFP 204. The protocol engine 302 may instruct the USB physical layer interface 304 to apply the appropriate electrical signals to the USB physical layer in order to communicate with the USB device 108 or the host 102. Likewise, the protocol engine 302 may instruct the remote interface 306 to exchange information with the remote USB extension device.

In one embodiment, the protocol engine 302 may be implemented within a logic device such as a PLD, an ASIC, a FPGA, and/or the like. In other embodiments, the protocol engine 302 may be implemented within a computing device having at least one processor and a memory containing computer-executable instructions that, if executed by the at least one processor, cause the protocol engine 302 to perform the actions discussed below; a dedicated digital hardware device implemented, for example, as a state machine configured to perform the actions described; within an application specific processor; and/or within any other suitable computing device.

In some embodiments, logic of actions attributed to a USB extension device is executed by a protocol engine 302, which then instructs a USB physical layer interface 304 and/or a remote interface 306 to perform the appropriate communication steps associated with the logic. Throughout the discussion below, such actions may simply be described as being performed by the UFP 202 or the DFP 204 as if it was a single device for ease of discussion. One of ordinary skill in the art will recognize that actions attributed directly to the UFP 202 or the DFP 204 may actually be performed by a protocol engine 302, a USB physical layer interface 304, a remote interface 306, and/or some other component of the USB extension device.

In some embodiments, the UFP 202 and DFP 204 may be configured to operate in one of a plurality of modes, depending on the latency of the link between them. In a low latency mode, the UFP 202 and DFP 204 may be linked by a communication channel of adequate speed to support a SuperSpeed USB 3.0 connection simply by bridging USB packets across the communication channel. In a medium latency mode, the UFP 202 and DFP 204 may use a first technique to compensate for the delay in packet transmission between the UFP 202 and the DFP 204, and in a high latency mode, the UFP 202 and the DFP 204 may use a second technique to compensate for the delay in packet transmission. In some embodiments, the mode may be selected by a user while configuring the UFP 202 and the DFP 204. In some embodiments, the UFP 202 and DFP 204 may automatically determine a degree of latency between the devices and may automatically choose a mode based on that determination.

Figure 4:
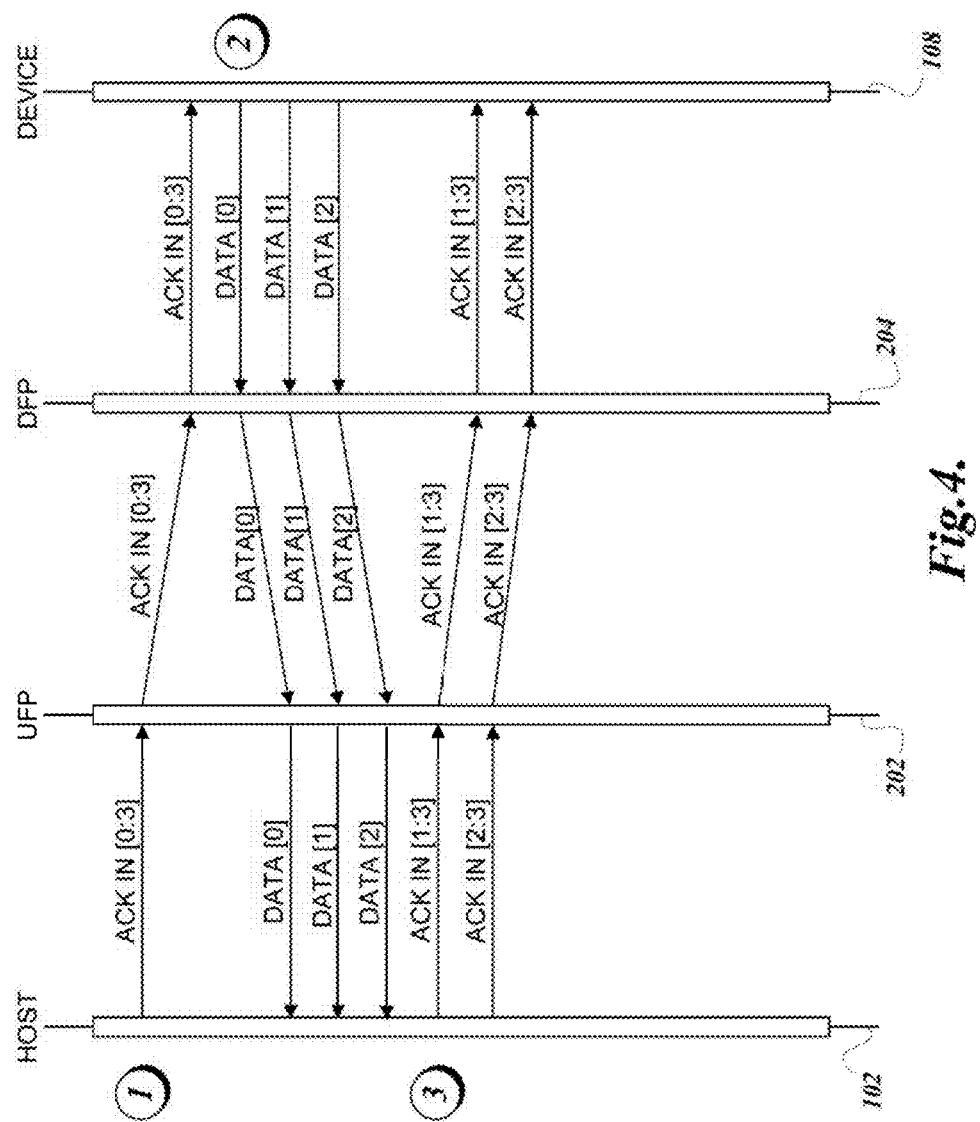
FIG. 4 is a sequence diagram that illustrates communication between a host and a USB device using an upstream facing port and a downstream facing port connected by a low latency communication channel, according to various aspects of the present disclosure.

FIG. 4 is a sequence diagram that illustrates communication between a host 102 and a USB device 108 according to various aspects of the present disclosure. The illustrated communication is an IN communication, in which the host 102 indicates that it is ready to receive data, and the USB device 108 transmits data to the host 102. FIG. 4 illustrates the use of a upstream facing port 202 and a downstream facing port 204, in a case wherein the latency between the upstream facing port 202 and the downstream facing port 204 is low enough that the upstream facing port 202 and the downstream facing port 204 may simply convert and bridge USB 3.0 physical layer signaling onto the communication channel connecting the upstream facing port 202 and downstream facing port 204. In this case, the communication channel connecting the upstream facing port 202 and downstream facing port 204 has a throughput capable of supporting a USB 3.0 SuperSpeed connection, such as 5.0 Gbps. In this low latency case, the latency between the upstream facing port 202, the downstream facing port 204, and the communication channel between the two do not impact timing parameters between the host 102 and the device 108.

At point 1 (FIG. 4), the host 102 generates a request packet, such as an ACK packet, and transmits it to the upstream facing port 202. The ACK packet indicates a sequence number ("0") and a number of packets that the host 102 is ready to accept ("3"). The upstream facing port 202 receives the packet and transmits it to the downstream facing port 204. The downstream facing port 204 then transmits the ACK packet to the USB device 108. At point 2, the USB device 108 begins transmitting DATA packets, starting at the indicated sequence number. The DATA packets are received by the downstream facing port 204, which forwards the DATA packets to the upstream facing port 202. The upstream facing port 202 then transmits the DATA packets to the host 102. At point 3, the host 102 transmits acknowledgement packets, such as ACK packets, indicating that the DATA packets were received to the upstream facing port 202. The upstream facing port 202 forwards the ACK packets to the downstream facing port 204, which in turn forwards the ACK packets to the USB device 108.

Figure 5:
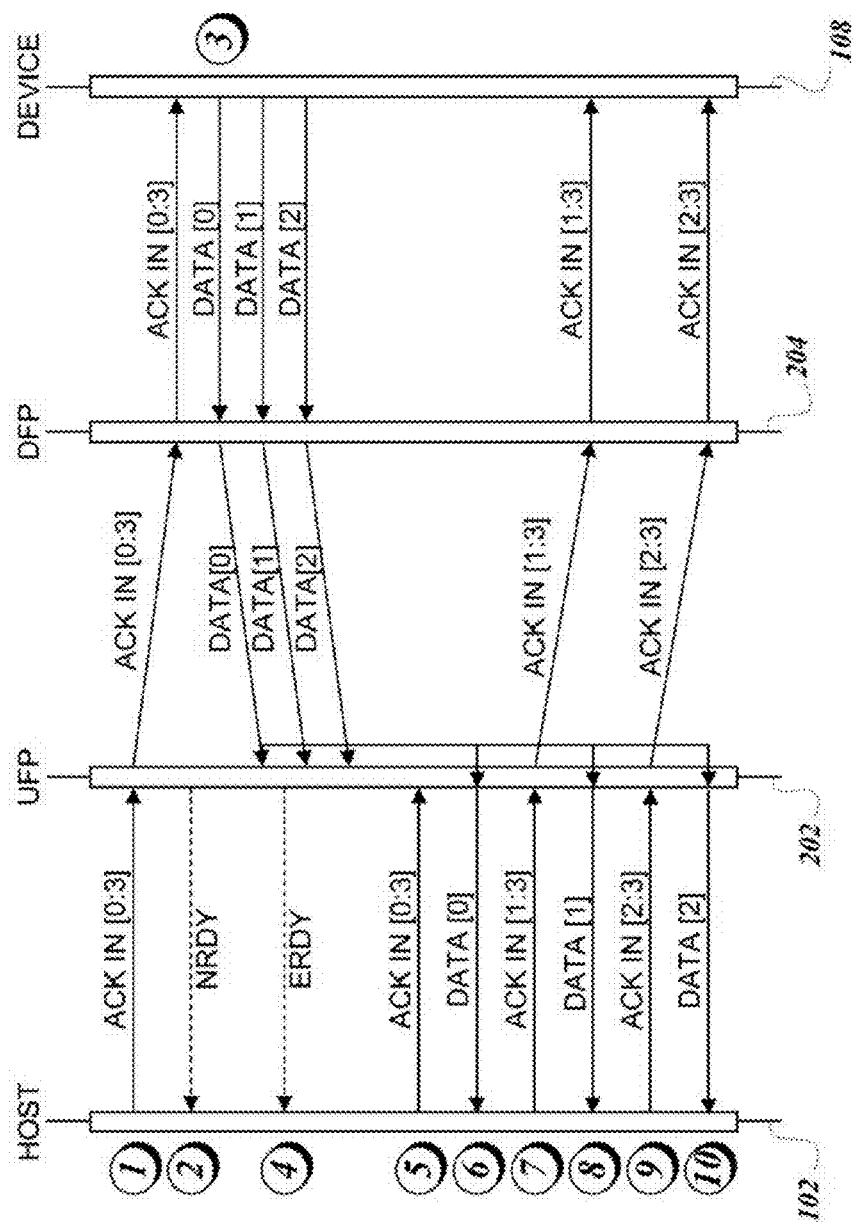
FIG. 5 is a sequence diagram that illustrates communication between a host and a USB device using an upstream facing port and a downstream facing port connected by a medium latency communication channel, according to various aspects of the present disclosure.

FIG. 5 is a sequence diagram that illustrates communication between a host 102 and a USB device 108 using an upstream facing port 202 and a downstream facing port 204 connected by a medium latency communication channel, according to various embodiments of the present disclosure. Similar to FIG. 4, the illustrated communication is an IN communication. In the illustrated embodiment, an NRDY/ERDY pair of packets is used to cause the host 102 to wait before continuing with the transaction in order to compensate for the medium latency communication channel.

At point 1, the host 102 indicates that it is ready to receive bulk data by transmitting an ACK packet indicating a sequence number ("0") and a number of packets ("3") that the host 102 expects from the USB device 108. The upstream facing port 202 transmits the ACK packet to the downstream facing port 204, which in turn transmits the ACK packet to the USB device 108. At point 2, the upstream facing port 202 transmits a NRDY packet to the host 102, which will cause the host 102 to wait for an ERDY packet before continuing with the transaction. At point 3, the USB device 108 transmits the requested DATA packets to the downstream facing port 204, which in turn transmits the DATA packets to the upstream facing port 202 via the communication channel. The upstream facing port 202 temporarily stores the received DATA packets. Once the upstream facing port 202 has received the start of the first DATA packet, at point 4, the upstream facing port 202 transmits an ERDY packet to the host 102.

At point 5, the host 102 retransmits the original ACK packet to the upstream facing port 202. The upstream facing port 202 does not forward this retransmitted ACK packet to the downstream facing port 202, but instead, at point 6, the upstream facing port 202 transmits to the host 102 the first DATA packet that had been received from the USB device 108 and stored by the upstream facing port 202. At point 7, the host 102 responds asynchronously to the upstream facing port 202 by transmitting an ACK packet to acknowledge receipt of the first DATA packet, which is transmitted by the upstream facing port 202 to the downstream facing port 204, and by the downstream facing port 204 to the USB device 108. At point 8, the upstream facing port 202 transmits to the host 102 the second DATA packet, and at point 9, the host 102 responds with another ACK packet that is relayed by the upstream facing port 202 and the downstream facing port 204 to the USB device 108. At point 10, the upstream facing port 202 transmits the third DATA packet to the host 102.

In some embodiments, the connection between the host 102 and the upstream facing port 202 may be suspended using techniques other than sending a pair of NRDY/ERDY packets. For example, in some embodiments, at point 2 instead of sending a NRDY packet, the upstream facing port 202 may send an arbitrary DATA packet to the host 102 in which the DATA packet is valid except for an intentionally generated CRC error. The upstream facing port 202 may continue sending DATA packets with CRC errors to the host 102 in response to ACK IN packets from the host 102 until the upstream facing port 202 receives the start of the first DATA packet from the downstream facing port 204. Once available, the upstream facing port 202 will send the first DATA packet (as illustrated at point 6) instead of sending another DATA packet with a CRC error.

One of ordinary skill in the art will recognize that the order in which some of the events are illustrated in FIG. 5 is exemplary only, and that in some embodiments, the order may be different, or the events may happen at the same time. For example, FIG. 5 illustrates transmission of ACK packets and DATA packets interleaved between the host 102 and the upstream facing port 202. In some cases that also comply with the USB specification, the DATA packets transmitted at points 6, 8, and 10 may be transmitted before either of the ACK packets at points 7 and 9 are transmitted. In some cases that also comply with the USB specification, such as with isochronous data traffic and/or the like, the host 102 may not transmit any ACK packets if the DATA packets are successfully received. One of ordinary skill in the art will recognize that these cases are exemplary only, and still other cases that also comply with the USB specification may occur without departing from the scope of the present disclosure.

Figure 6:
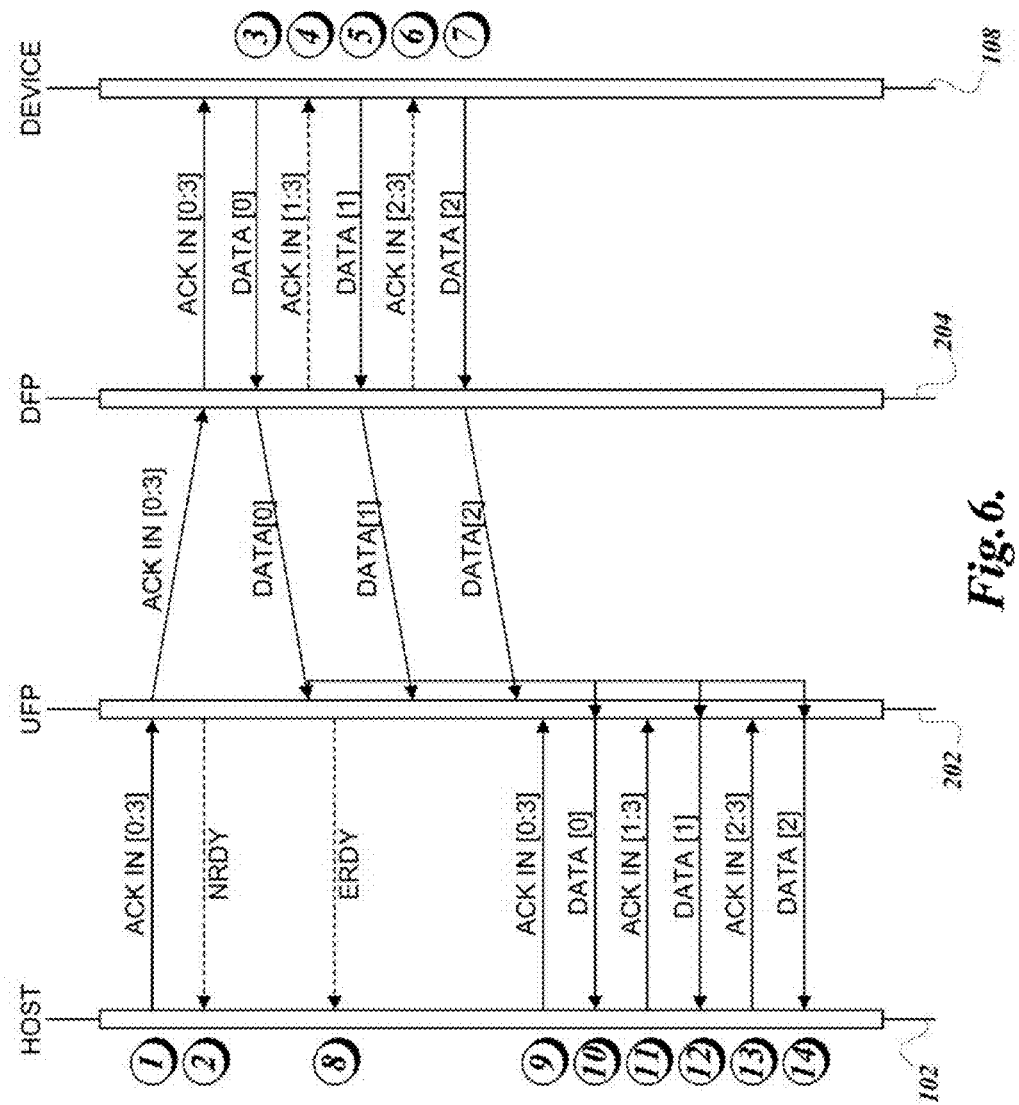
FIG. 6 is a sequence diagram that illustrates communication between a host and a USB device using an upstream facing port and a downstream facing port connected by a high latency communication channel, according to various aspects of the present disclosure.

FIG. 6 is a sequence diagram that illustrates communication between a host 102 and a USB device 108 using an upstream facing port 202 and a downstream facing port 204 connected by a high latency communication channel, according to various aspects of the present disclosure. Similar to FIGS. 4 and 5, the illustrated communication is an IN communication.

At point 1, the host 102 indicates that it is ready to receive bulk data by transmitting an ACK packet indicating a sequence number ("0") and a number of packets ("3") that the host 102 expects from the USB device 108. The upstream facing port 202 transmits the ACK packet to the downstream facing port 204 over the high-latency communication channel, and the downstream facing port 204 transmits the ACK packet to the USB device 108. As the data packets from the USB device 108 will have to traverse the high-latency communication channel, at point 2, the upstream facing port 202 generates and sends a NRDY packet to the host 102 to place the host in a waiting state or an asynchronous state.

At point 3, the USB device 108 transmits a first DATA packet to the downstream facing port 204. The downstream facing port 204 transmits the first DATA packet to the upstream facing port 202 over the high-latency communication channel, and the upstream facing port 202 temporarily stores the first DATA packet. As the latency between the upstream facing port 202 and the downstream facing port 204 may be too high for timely transmission of ACK packets, at point 4 the downstream facing port 204 generates an appropriate ACK response packet and transmits it to the USB device 108. Similar steps are repeated at point 5, where the USB device 108 transmits a second DATA packet to the downstream facing port 204 for transmission to and storage at the upstream facing port 202, point 6, where the downstream facing port 204 generates another appropriate ACK response packet and transmits it to the USB device 108, and at point 7, where the USB device 108 transmits a third DATA packet to the downstream facing port 204 for transmission to and storage at the upstream facing port 202.

At point 8, after the upstream facing port 202 has started receiving the first DATA packet, the upstream facing port 202 generates an ERDY packet and transmits it to the host 102 to take the host 102 out of the waiting state or the asynchronous state. At point 9, the host 102 retransmits the original ACK packet. Since transmission of the DATA packets to the upstream facing port 202 has already begun, the upstream facing port 202 does not forward the ACK packet to the downstream facing port 204. Instead, at point 10, in response to the ACK packet, the upstream facing port 202 transmits the first stored DATA packet to the host 102. At point 11, the host 102 transmits an ACK packet to the upstream facing port 202 that implicitly indicates that the first DATA packet was received and requests the next packet. At point 12, the upstream facing port 202 transmits the second stored DATA packet to the host 102. At point 13, the host 102 transmits an ACK packet to the upstream facing port 202 that implicitly indicates that the second DATA packet was received and requests the next packet. At point 14, the upstream facing port 202 transmits the third stored DATA packet to the host 102. As with the retransmitted ACK packet at point 9, the other ACK packets transmitted at points 11 and 13 are not forwarded by the upstream facing port 202 to the downstream facing port 204, as the USB device 108 has already received ACK packets generated by and transmitted from the downstream facing port 204.

In some embodiments, the pair of NRDY/ERDY packets transmitted at point 2 and point 8 may be repeated if the bandwidth or latency between the upstream facing port 202 and the downstream facing port 204 is insufficient for the second and third DATA packets to arrive in time for the upstream facing port 202 to timely respond to the ACK IN packets transmitted at point 11 and point 13. For example, if, after receiving the ACK IN packet transmitted at point 11, the upstream facing port 202 is not ready to proceed to point 12 to begin transmitting the second DATA packet, the upstream facing port 202 may instead transmit a NRDY packet, and may transmit a corresponding ERDY packet once ready to proceed to point 12. In some embodiments, this may occur at any point when the upstream facing port 202 is not ready to provide a DATA packet in response to an ACK IN packet from the host 102.

Figure 7:
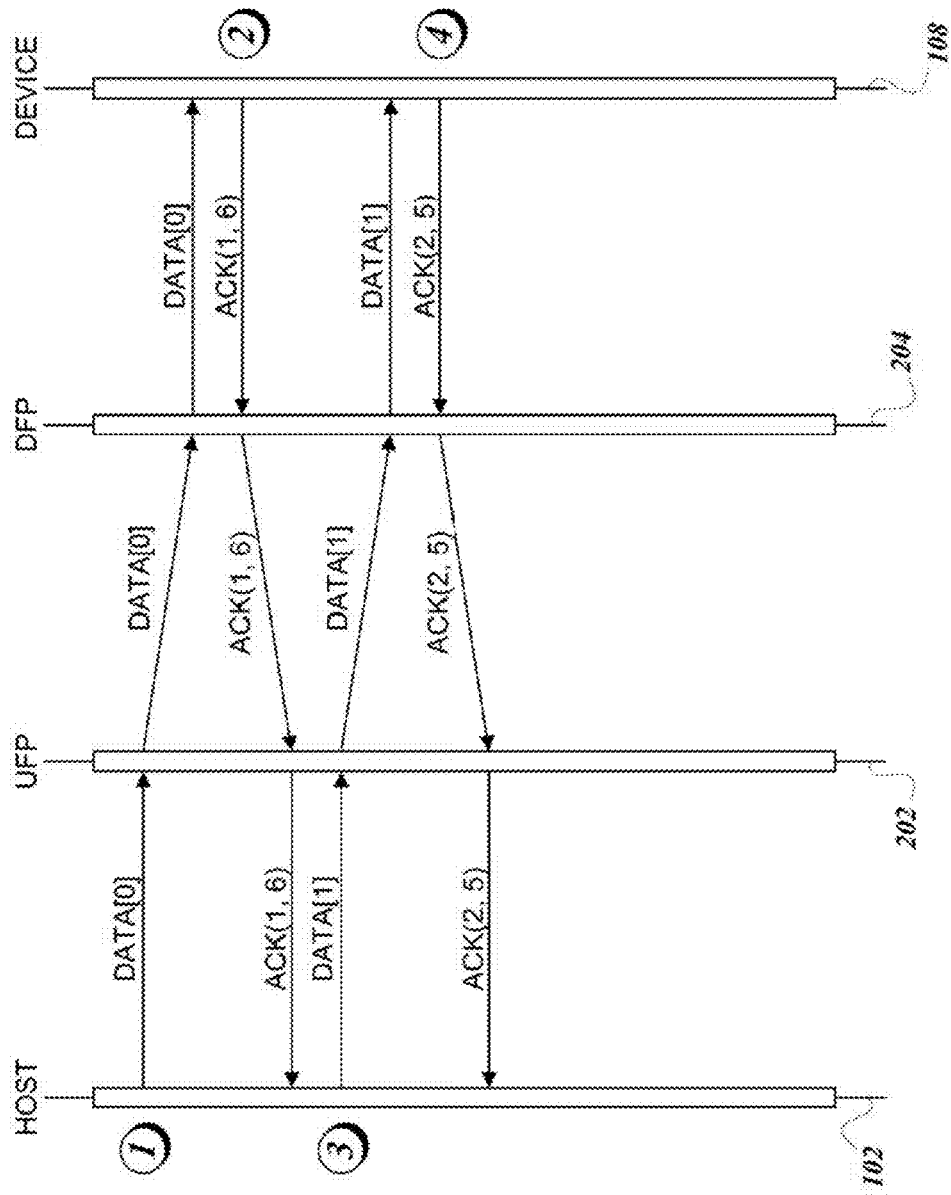
FIG. 7 is a sequence diagram that illustrates communication between a host and a USB device using an upstream facing port and a downstream facing port connected by a low latency communication channel, according to various aspects of the present disclosure.

FIG. 7 is a sequence diagram that illustrates communication between a host 102 and a USB device 108 using an upstream facing port 202 and a downstream facing port 204 connected by a low latency communication channel, according to various embodiments of the present disclosure. The illustrated communication is an OUT communication, in which the host 102 transmits data to the USB device 108. Similar to the discussion above with respect to FIG. 4, the latency between the upstream facing port 202 and the downstream facing port 204 is low enough that the upstream facing port 202 and the downstream facing port 204 may simply convert and bridge USB 3.0 physical layer signaling onto the communication channel connecting the upstream facing port 202 and downstream facing port 204.

At point 1, the host 102 transmits a first DATA packet to the upstream facing port 202. The upstream facing port 202 transmits the first DATA packet to the downstream facing port 204, which in turn transmits the first DATA packet to the USB device 108. At point 2, the USB device 108 generates an ACK packet indicating a sequence number ("1") of the next DATA packet expected by the USB device 108, and a buffer count ("6") indicating the amount of buffer space available for receiving DATA packets. The ACK packet is transmitted to the downstream facing port 204, and then to the upstream facing port 202 and the host 102. In some embodiments, the ACK packet is not substantively altered by the downstream facing port 204 or the upstream facing port 202. At point 3, the host 102 transmits the second DATA packet to the upstream facing port 202. As before, the upstream facing port 202 transmits the second DATA packet to the downstream facing port 204, which in turn transmits the second DATA packet to the USB device 108. At point 4, the USB device 108 generates an ACK packet indicating a sequence number ("2") of the next DATA packet expected by the USB device 108, and a buffer count ("5") indicating the amount of buffer space available for receiving DATA packets. The buffer space available has been reduced by one, as the first packet is stored in the buffer. The ACK packet is transmitted to the downstream facing port 204, and then to the upstream facing port 202 and the host 102 without substantive changes.

Figure 8:
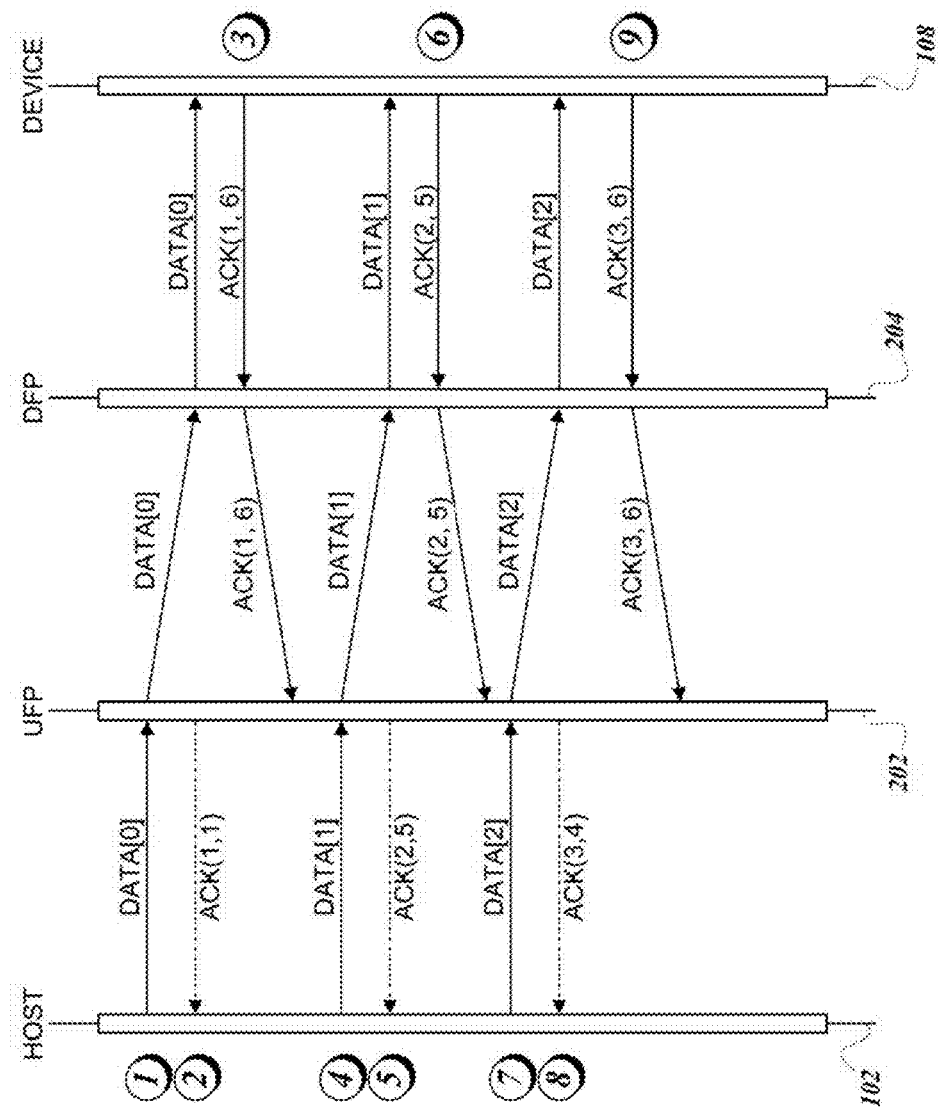
FIG. 8 is a sequence diagram that illustrates communication between a host and a USB device using an upstream facing port and a downstream facing port connected by a high latency communication channel, according to various aspects of the present disclosure.

FIG. 8 is a sequence diagram that illustrates communication between a host 102 and a USB device 108 using an upstream facing port 202 and a downstream facing port 204 connected by a high latency communication channel, according to various embodiments of the present disclosure. The illustrated communication is an OUT communication, similar to the communication described with respect to FIG. 7, but over a high latency communication channel. In this situation, the upstream facing port 202 generates ACK packets and transmits them to the host 102 in order to meet the latency requirements of the USB Specifications.

At point 1, the host 102 transmits a first DATA packet to the upstream facing port 202. The upstream facing port 202 transmits the first DATA packet to the downstream facing port 204 over the high latency communication channel. The downstream facing port 204 in turn transmits the first DATA packet to the USB device 108. At point 2, the upstream facing port 202 generates an ACK packet to implicitly acknowledge receipt of the first DATA packet and to request a second DATA packet. As discussed above with respect to FIG. 7, the ACK packet includes a sequence number ("1") and a buffer count ("1") indicating the amount of buffer space available for receiving DATA packets. As the upstream facing port 202 has not yet received an ACK packet generated by the USB device 108, the upstream facing port 202 does not know the actual amount of available buffer space. Accordingly, the upstream facing port 202 generates an ACK packet with a predetermined value, such as "1," for the amount of available buffer space, and transmits the ACK packet to the host 102. The use of "1" as the amount of available buffer space when the available buffer space is unknown is exemplary only. In some embodiments, a value other than "1" may be used, and the upstream facing port 202 will interact with the host 102 accordingly.

The transmission of the ACK packet by the upstream facing port 202 causes the downstream facing port 204 to be responsible for ensuring transmission of the DATA packet to the USB device 108. That is, if any errors are detected in the transmission of the DATA packet from the downstream facing port 204 to the USB device 108, the downstream facing port 204 should attempt to retry transmission of the DATA packet from the downstream facing port 204 to the USB device 108, an example of which is discussed further below with respect to FIG. 9.

At point 3, the USB device 108 has received the first DATA packet, and generates an ACK packet that includes a sequence number ("1") and a buffer count ("6"). The downstream facing port 204 receives the ACK packet and transmits it to the upstream facing port 202 via the high latency communication channel. The upstream facing port 202 receives the ACK packet, but does not transmit it to the host 102, because an ACK packet was already generated and transmitted to the host 102 at point 2. The upstream facing port 202 does, however, extract the buffer count from the ACK packet for future use.

At point 4, the host 102 transmits a second DATA packet to the upstream facing port 202. The upstream facing port 202 transmits the second DATA packet to the downstream facing port 204, which in turn transmits the second DATA packet to the USB device 108. At point 5, the upstream facing port 202 generates an ACK packet in response to the second DATA packet, and transmits it to the host 102. The upstream facing port 202 uses the buffer count received from the downstream facing port 204 and USB device 108 at point 3 to predict an amount of available buffer space at the USB device 108. For example, the upstream facing port 202 may reduce the value by one to account for the currently received packet. Accordingly, the illustrated ACK packet includes a sequence number of "2" and a buffer count of "5." At point 6, the USB device 108 generates an ACK packet, which is then transmitted to the downstream facing port 204 and the upstream facing port 202. Again, the upstream facing port 202 does not forward this ACK packet to the host 102, because an ACK packet was already generated and sent.

The third DATA packet is transmitted using a similar technique. At point 7, the third DATA packet is transmitted by the host 102 to the upstream facing port 202. The upstream facing port 202 transmits the third DATA packet to the downstream facing port 204 via the high latency communication channel, and the downstream facing port 204 transmits the third DATA packet to the USB device 108. At point 8, the upstream facing port 202 predicts the amount of available buffer space at the USB device 108, and includes the predicted amount in an ACK packet transmitted to the host 102. At point 9, the USB device 108 creates an ACK packet and transmits it to the downstream facing port 204. The downstream facing port 204 transmits the ACK packet to the upstream facing port 202, which consumes the packet without forwarding it to the host 102.

Though the sequence diagrams and descriptions thereof illustrate and describe steps being performed in a particular sequence, in some embodiments, some of the steps may be performed in a different order than illustrated or described, or may take place in parallel. As one example, in FIG. 5, the ACK packet transmitted by the host 102 at point 5 may be transmitted before the upstream facing port 202 has received all of the DATA packets from the downstream facing port 204. As another example from FIG. 5, the ACK packets transmitted by the host 102 at points 7 and 9 may be transmitted after more than one, or all, of the DATA packets are received from the upstream facing port 202.

Further, though FIGS. 4, 5, and 6 illustrate the transmission of three DATA packets, and FIGS. 7 and 8 illustrate the transmission of two and three DATA packets, respectively, one of ordinary skill in the art will recognize that, in some embodiments, either more or less DATA packets may be transmitted as part of a single bulk transaction.

Figure 9:
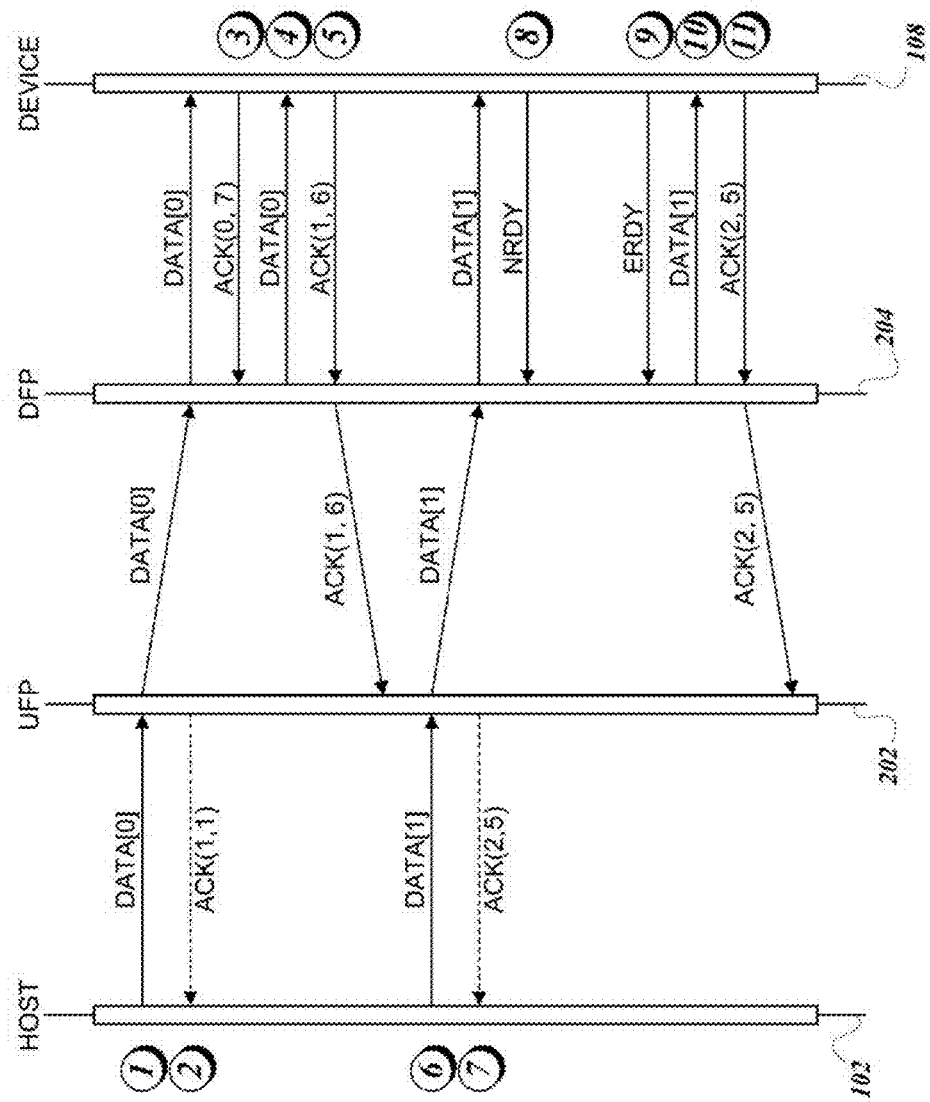
FIG. 9 is a sequence diagram that illustrates embodiments of error handling between a downstream facing port and a USB device according to various aspects of the present disclosure.

If the upstream facing port 202 or the downstream facing port 204 generates an ACK packet before receiving acknowledgement that a DATA packet was successfully delivered, as described above in relation to FIGS. 6 and 8, the downstream facing port 204 and the upstream facing port 202 are responsible for ensuring that the DATA packet is properly transmitted without issuing a retry packet to the originally sending device. FIG. 9 is a sequence diagram that illustrates embodiments of error handling between a downstream facing port 204 and a USB device 108 according to various aspects of the present disclosure. The sequence diagram illustrates a first DATA packet experiencing a retry error (between point 1 and point 5), and a second DATA packet experiencing a device not ready error (between point 6 and point 12).

Similar to the sequence illustrated in FIG. 8, at point 1, the host 102 transmits a first DATA packet to the upstream facing port 202, which transmits the packet to the downstream facing port 204, which in turn transmits the packet to the USB device 108. At point 2, the upstream facing port 202 generates an ACK packet to implicitly acknowledge receipt of the first DATA packet and to request a second DATA packet. By generating the ACK packet, the upstream facing port 202 is guaranteeing that the first DATA packet has successfully been delivered to the USB device 108. The upstream facing port 202 and the downstream facing port 204 ensure that the first DATA packet is transferred to the downstream facing port 204 via any suitable protocol known to one of ordinary skill in the art. Hence, the downstream facing port 204 becomes responsible for guaranteeing that the first DATA packet is delivered to the USB device 108.

At point 3, the USB device 108 transmits an ACK packet to the downstream facing port 204. The ACK packet has a retry bit set, and a sequence number of "1," thus indicating that the first DATA packet did not arrive properly and should be resent. At point 4, instead of forwarding the ACK packet to the upstream facing port 202, the downstream facing port 204 detects the retry bit and resends the first DATA packet to the USB device 108. At point 5, the USB device 108 generates an ACK packet that indicates that the first DATA packet was successfully received. Similar to point 3 in FIG. 8, the USB device 108 transmits the ACK packet to the downstream facing port 204, which in turn forwards the ACK packet to the upstream facing port 204. In some embodiments, the exchange that occurs at point 3 and point 4 may be repeated if the USB device 108 again fails to successfully receive the first DATA packet.

At point 6, and similar to the sequences discussed above, the host 102 transmits a second DATA packet to the upstream facing port 202, which transmits the packet to the downstream facing port 204, which in turn transmits the packet to the USB device 108. At point 7, the upstream facing port 202 generates an ACK packet to implicitly acknowledge receipt of the first DATA packet and to request a second DATA packet. As discussed above, the ACK packet also indicates that the upstream facing port 202 and downstream facing port 204 will guarantee transmission of the second DATA packet to the USB device 108 without further action being needed from the host 102. At point 8, the USB device 108 generates a NRDY packet and transmits it to the downstream facing port 204. The NRDY packet indicates that the USB device 108 was not prepared to accept the second DATA packet, and places the downstream facing port 204 into a waiting state or an asynchronous state. In some embodiments, the downstream facing port 204 may notify the upstream facing port 202 that the USB device 108 is not ready to accept DATA packets, and the upstream facing port 202 may send an NRDY packet to the host 102 to reduce the need for the downstream facing port 204 to buffer data to be sent to the USB device 108.

At point 9, the USB device 108 indicates that it is prepared to accept the second DATA packet by transmitting an ERDY packet to the downstream facing port 204. The downstream facing port 204 does not forward the ERDY packet (or the NRDY packet) to the upstream facing port 202, but instead, at point 10, re-transmits the second DATA packet to the USB device 108. Similar to other transmissions discussed above, at point 11, the USB device 108 generates an ACK packet. The USB device 108 transmits the ACK packet to the downstream facing port 204, which in turn transmits the ACK packet to the upstream facing port 202.

The two error cases depicted in FIG. 9 illustrate errors in communication between the downstream facing port 204 and a device 108 that are communicating using a method similar to that illustrated and described above with respect to FIG. 8. However, one of ordinary skill in the art will recognize that similar techniques may be used for handling errors between the host 102 and the upstream facing port 202 without departing from the scope of the present disclosure. The techniques used between the host 102 and the upstream facing port 202 may not be identical, in that the host 102 may issue ACK packets with a host error bit set instead of ACK packets with a retry bit set, but one of ordinary skill in the art will nevertheless understand that similar techniques to those described above may be used to handle these errors.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for enabling USB 3.0 communication between a host and a USB device over a communication channel that is not USB 3.0 compliant, the method comprising:
   receiving, by a device configured to provide an upstream facing port (UFP device), a request packet via a USB-compliant communication channel from the host;
   transmitting, by the UFP device, the request packet via a non-USB communication channel to a device configured to provide a downstream facing port (DFP device);
   generating and transmitting, by the UFP device, a packet to the host for placing the host in a waiting state or an asynchronous state; and
   transmitting, by the UFP device, a packet to the host for removing the host from the waiting state or the asynchronous state in response to receiving at least a portion of a requested data packet from the DFP device.

2. The method of claim 1, wherein the packet for placing the host in a waiting state or an asynchronous state is a NRDY packet, and wherein the packet for removing the host from the waiting state or the asynchronous state is an ERDY packet.

3. The method of claim 1, wherein the packet for placing the host in a waiting state or an asynchronous state is one or more DATA packets having CRC errors, and wherein the packet for removing the host from the waiting state or the asynchronous state is a valid DATA packet.

4. The method of claim 1, further comprising:
   receiving, by the UFP device, a subsequent request packet from the host that implicitly indicates that a data packet was received by the host;
   consuming, by the UFP device, the subsequent request packet without transmitting it to the DFP device when the UFP device has received from the DFP device a packet requested by the subsequent request packet and the UFP device is configured in a first latency mode; and
   transmitting, by the UFP device, the subsequent request packet to the DFP device when a packet requested by the subsequent request packet has not been received by the UFP device or when the UFP device is configured in a second latency mode.

5. The method of claim 1, further comprising storing, by the UFP device, one or more data packets received from the DFP device before transmission to the host.

6. A computing device configurable to provide an upstream facing port (UFP) through which a host can communicate with a USB device via a computing device configurable to provide a downstream facing port (DFP) wherein the computing device configurable to provide the UFP is configured to:
   receive, by the UFP from the host over a USB 3.0-compliant communication channel, a first data packet;
   transmit, over a noncompliant communication channel to the computing device configurable to provide the DFP, the first data packet;
   generate, before receiving an acknowledgement packet from the computing device configurable to provide the DFP, an acknowledgement packet that indicates a predetermined available buffer count; and
   transmit the generated acknowledgement packet to the host.

7. The computing device of claim 6, further configured to:
   receive, from the computing device configured to provide the DFP, an acknowledgement packet that indicates an available buffer count received from a USB device connected to the DFP;
   receive, from the host, a second data packet; and
   generate a second acknowledgement packet that indicates an available buffer count based on the available buffer count indicated by the acknowledgement packet received from the computing device configurable to provide the DFP.

8. The computing device of claim 7, wherein generating a second acknowledgement packet includes generating a second acknowledgement packet that indicates an available buffer count that is capable of storing one less packet than the available buffer count indicated by the acknowledgement packet received from the computing device configurable to provide the DFP.

9. The computing device of claim 6, wherein the predetermined available buffer count is an available buffer count capable of storing a single packet.

10. A computing device configurable to provide a downstream facing port (DFP) through which a USB device can communicate with a host via a computing device configurable to provide an upstream facing port (UFP), wherein the computing device configurable to provide the DFP is configured to:
    receive, from the computing device configurable to provide the UFP via a noncompliant communication channel, a first data packet;
    transmit, to a USB device via a USB 3.0-compliant communication channel, the first data packet; and
    receive, from the USB device, a response packet transmitted in response to the first data packet;
    wherein the response packet is a first acknowledgement packet including an indication that the first data packet was not successfully received by the USB device, and wherein the method further comprises retransmitting, to the USB device, the first data packet.

11. The computing device of claim 10, wherein the first acknowledgement packet is an ACK packet that includes a sequence number of the first data packet and having a retry bit set to a value indicating that the packet should be resent.

12. The computing device of claim 10, further configured to:
    receive, from the USB device, a second acknowledgement packet indicating that the first data packet was successfully received; and
    transmit, to the computing device configurable to provide the UFP, the second acknowledgement packet but not the first acknowledgement packet.

13. The computing device of claim 10, wherein the response packet is a packet for placing the DFP in a waiting state or an asynchronous state; and wherein the computing device is further configured to:
    receive, from the USB device, a packet for removing the DFP from the waiting state or the asynchronous state;
    retransmit, to the USB device, the first data packet.

14. The computing device of claim 13, further configured to:
    receive, from the USB device, an acknowledgement packet indicating that the first data packet was successfully received; and
    transmit, to the computing device configurable to provide the UFP, the acknowledgement packet but not the packet for placing the DFP in a waiting state or an asynchronous state, or the packet for removing the DFP from the waiting state or the asynchronous state.

15. A method for enabling USB 3.0 communication between a host and a USB device over a communication channel that is not USB 3.0 compliant, the method comprising:
    receiving, by a device configured to provide a downstream facing port (DFP device) a request packet via a non-USB communication channel;
    transmitting, by the DFP device, the request packet via a USB-compliant communication channel to the USB device;
    receiving, by the DFP device, a data packet from the USB device;
    transmitting, by the DFP device, the data packet via the non-USB communication channel; and
    generating, by the DFP device, an acknowledgement packet and transmitting the generated acknowledgement packet to the USB device that implicitly indicates that the data packet was received by the host by requesting a subsequent data packet.

16. The method of claim 15, wherein the request packet includes a sequence number and a buffer count.

17. The method of claim 15, wherein the request packet is a USB packet.

18. The method of claim 17, wherein the request packet is an ACK IN packet.

19. The method of claim 15, wherein the USB-compliant communication channel is a USB 3.0-compliant communication channel.

20. The method of claim 15, wherein the acknowledgement packet is an ACK IN packet, and wherein the acknowledgement packet includes a sequence number different than a sequence number included in the request packet.

21. A method for enabling USB 3.0 communication between a host and a USB device over a communication channel that is not USB 3.0 compliant, the method comprising:
    receiving, by a device configured to provide a downstream facing port (DFP device), a request packet via a non-USB communication channel;
    transmitting, by the DFP device, the request packet via a USB-compliant communication channel to the USB device;
    receiving, by the DFP device, a data packet from the USB device;

transmitting, by the DFP device, the data packet via the non-USB communication channel; and transmitting, by the DFP device, a received acknowledgement packet to the USB device that implicitly indicates that the data packet was received by the host by requesting a subsequent data packet in response to receiving the acknowledgement packet via the non-USB communication channel.

22. The method of claim 21, wherein the request packet includes a sequence number and a buffer count.

23. The method of claim 21, wherein the request packet is a USB packet.

24. The method of claim 23, wherein the request packet is an ACK IN packet.

25. The method of claim 21, wherein the USB-compliant communication channel is a USB 3.0-compliant communication channel.

26. The method of claim 21, wherein the acknowledgement packet is an ACK IN packet, and wherein the acknowledgement packet includes a sequence number different than a sequence number included in the request packet.

* * * * *